United States Patent [19]
Gibbs et al.

[11] Patent Number: 6,046,917
[45] Date of Patent: Apr. 4, 2000

[54] CONTROLLED RECTIFIER BRIDGE AND SYSTEM

[75] Inventors: Irving A. Gibbs, Fletcher, N.C.; Bruce R. Quayle, Pittsburgh, Pa.

[73] Assignee: Eaton Corporation, Cleveland, Ohio

[21] Appl. No.: 09/304,480

[22] Filed: May 3, 1999

[51] Int. Cl.$^7$ .................................................. H02M 5/458
[52] U.S. Cl. ................................................ 363/69; 363/52
[58] Field of Search .................................. 363/52, 53, 65, 363/67, 69, 70

[56] References Cited

U.S. PATENT DOCUMENTS

| | | | |
|---|---|---|---|
| 3,911,324 | 10/1975 | Bishop | 363/52 |
| 4,488,212 | 12/1984 | Rettig | 363/54 |
| 4,622,629 | 11/1986 | Glennon | 363/70 |
| 4,787,022 | 11/1988 | Maeba et al. | 363/52 |
| 5,267,137 | 11/1993 | Goebel | 363/87 |
| 5,311,419 | 5/1994 | Shires | 363/65 |
| 5,319,536 | 6/1994 | Malik | 363/65 |
| 5,796,601 | 8/1998 | Yamamoto | 363/84 |
| 5,953,223 | 9/1999 | Kato | 363/69 |
| 5,956,244 | 9/1999 | Rehm et al. | 363/70 |
| 5,982,648 | 11/1999 | Wang | 363/70 |

*Primary Examiner*—Adolf Deneke Berhane
*Attorney, Agent, or Firm*—Martin J. Moran

[57] ABSTRACT

A controlled rectifier or SCR bridge converts a plurality of alternating current voltages from a plurality of alternating current phases to a rectified voltage. The bridge includes an input interconnected with the alternating current phases and an output having the rectified voltage. The bridge has a segment for each of the positive and negative polarities of the alternating current phases. Each of the segments has an SCR responsive to a control signal in order to control current conduction within the segment between the input and the output of the bridge. A phase control circuit outputs some of the control signals to some of the segments in order to control current conduction within the segments. A phase lock loop or startup circuit detects an abnormal condition of the AC voltages of the alternating current phases. A force firing circuit repetitively and simultaneously outputs all of the control signals to the segments in response to the abnormal AC phase conditions in order that the SCR bridge emulates a diode bridge.

20 Claims, 7 Drawing Sheets

CONTROLLED RECTIFIER BRIDGE AND SYSTEM

CROSS REFERENCE TO RELATED APPLICATION

This Application is related to commonly assigned, copending application Ser. No. 09/304,749, filed May 03, 1999, entitled "Excitation Control System for Rotating Electrical Apparatus" by Gibbs.

BACKGROUND OF THE INVENTION

1. Field of the Invention

This invention pertains generally to controlled rectifier bridges for converting alternating current (AC) to direct current (DC), and, in particular, to three-phase semiconductor controlled rectifier (SCR) bridges for providing excitation voltage to generators. The invention also pertains to controlled rectifier bridge systems.

2. Background Information

Three-phase rectifier circuits are commonly employed to convert AC signals to DC signals. These circuits often use SCRs disposed in bridge segments, with typically one SCR for each polarity of each AC phase. Typically, a bridge firing control circuit controls the firing point for each rectifier in each AC cycle.

It is not uncommon for a plurality of SCR bridges to be operated in parallel with each of the corresponding bridge firing control circuits being controlled by a central firing control circuit. The central firing control circuit manages each of the bridge firing control circuits in order that the corresponding rectifiers in each of the parallel bridges conduct current at the same point in the AC waveform.

SCR bridges are commonly employed in an excitation control system to provide field excitation for a rotating electrical apparatus (e.g., large synchronous generators and motors, utility synchronous generators and motors, industrial synchronous motors and generators, synchronous generators and motors for naval or other shipping applications, synchronous generators and motors for oil well drilling rigs). When the generator is on-line, generator field excitation is provided thereto. However, certain faults in the output power circuit of the generator may disturb the voltage fed into the excitation control system, thereby causing the excitation to the generator to shut off. For example, disturbances in the input voltage to the phase lock loop (PLL) of the control system may be caused by faults, such as single line-to-ground faults, line-to-line faults and three-phase faults that occur in the power circuit when the generator's circuit breaker contacts are closed.

When starting a field excitation control system, the AC input voltage to the controlled rectifier bridge is very low or non-existent. This is also the case during certain faults. Prior proposals have phase-controlled the bridge in order to obtain the desired output and, thus, have required some measurable AC input voltage to start the system. Typically, this AC input voltage was used as an input to a PLL or other timing circuit in order to maintain the requisite timing for firing the cells (e.g., SCRs) of the bridge. Accordingly, there is room for improvement.

SUMMARY OF THE INVENTION

The present invention provides improvements in the operation of a controlled rectifier bridge. Normally, at one time, only some of the segments of the controlled rectifier bridge respond to firing control signals in order to control current conduction within the segments between the input and output of the bridge. In accordance with the invention, under abnormal conditions of the alternating current (AC) voltages of the AC phases, the control signals are repetitively and simultaneously output to each of the segments in order that the controlled rectifier bridge emulates a diode bridge.

"Force firing" does not require an input voltage, but effectively turns an SCR bridge into a rectifier bridge. This is accomplished by firing all of the SCRs with a repetitive pulse train. Thus, the output of the SCR bridge during the required interval of starting, or during certain fault conditions, is "force fired" as high as possible. Preferably, in order to minimize power supply requirements, the pulse width of the firing control pulses is reduced during the "force firing" mode.

As one aspect of the invention, a controlled rectifier bridge for converting a plurality of AC voltages from a plurality of AC phases to a rectified voltage comprises an input interconnected with the AC phases and an output having the rectified voltage. A segment is provided for each of the positive and negative polarities of the AC phases. Each of the segments has an element responsive to a control signal in order to control current conduction within the segment between the input and the output of the controlled rectifier bridge. A means outputs some of the control signals to some of the segments in order to control current conduction within the segments. A means detects an abnormal condition of the AC voltages of the AC phases. A means repetitively and simultaneously outputs all of the control signals to the segments in response to the abnormal condition in order that the controlled rectifier bridge emulates a diode bridge.

As another aspect of the invention, a system converts a plurality of AC voltages of a plurality of AC phases to a rectified voltage. Each of the AC phases has a positive polarity and a negative polarity. The system comprises a plurality of controlled rectifier bridges, a plurality of bridge control means, and a central control circuit. Each of the bridges comprises an input interconnected with the AC phases, an output having the rectified voltage, and a segment for each of the positive and negative polarities of the AC phases. Each of the segments has an element responsive to a firing control signal in order to control current conduction within the segment between the input and the output of the controlled rectifier bridge. Each of the bridge control means is responsive to a plurality of synchronized control signals for outputting some or all of the firing control signals to some or all of the segments in order to control current conduction within the segments of a corresponding one of the bridges. The central control circuit comprises a means for outputting a plurality of first synchronized control signals to the bridge control means in order to control current conduction within some of the segments of corresponding ones of the bridges, a means for detecting an abnormal condition of the AC voltages of the AC phases, and a means responsive to the abnormal condition for outputting a plurality of second synchronized control signals to the bridge control means in order to simultaneously output all of the firing control signals to all of the segments.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
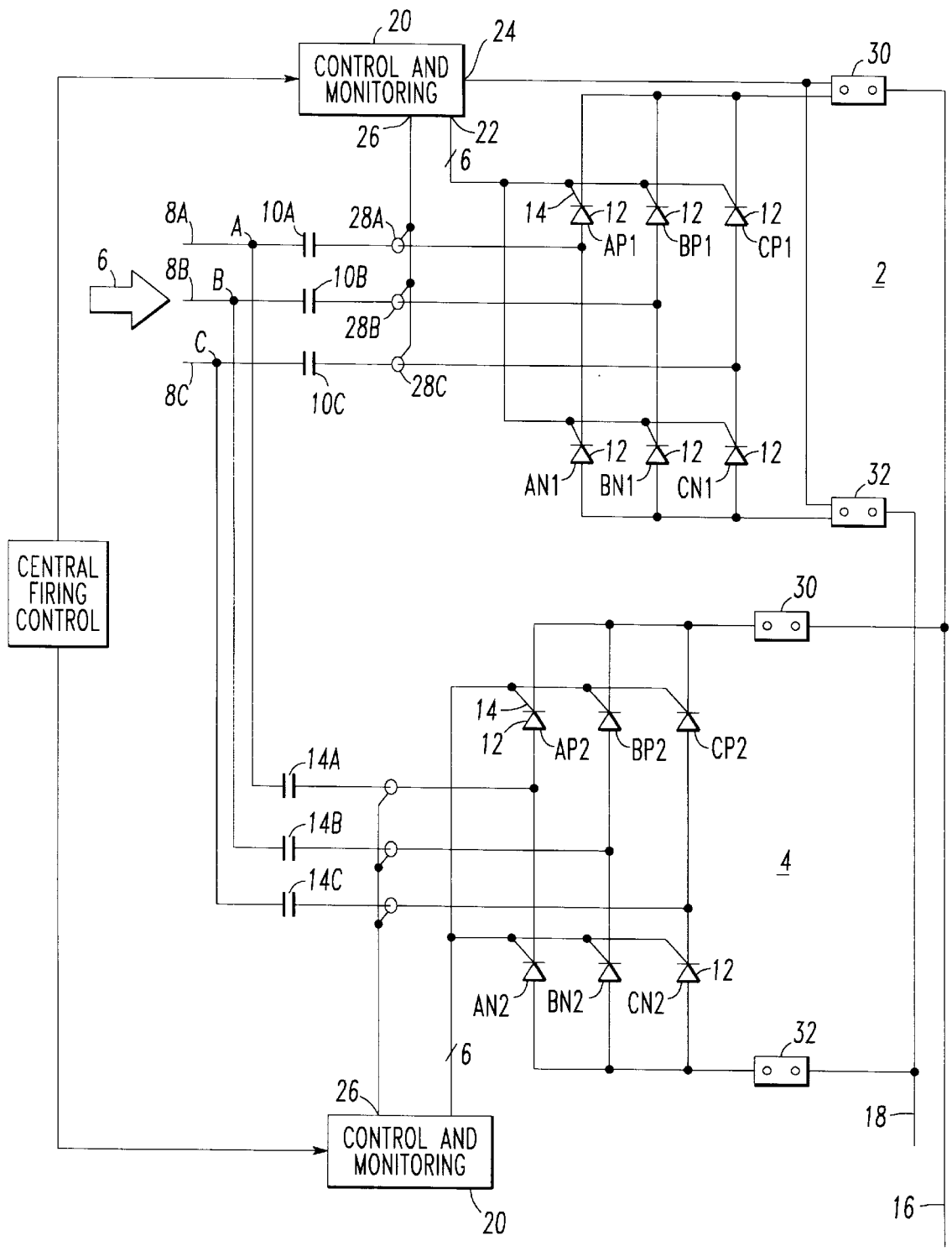
FIG. 1 is a circuit block diagram of two, three-phase, SCR bridges which are fed from a common three-phase source and are connected in parallel to provide an additive current output.

Bridges of semiconductor controlled rectifiers (SCRs) are generally employed to convert alternating current (AC) sinusoidal signal waveforms to direct current (DC). As shown in FIG. 1, two controlled rectifier bridges 2,4 are connected in parallel. Each of the bridges 2,4 receives a multi-phase current input from a common AC source 6 (e.g., a motor generator, field transformer, power potential transformer (PPT)). A three-phase current input is employed in this example, although the invention is applicable to a wide range of phase counts. The several phases of input current, shown as 8A, 8B and 8C, are fed through contacts 10A, 10B and 10C, and 14A, 14B and 14C, respectively, to rectifying segments on the two respective bridges 2,4.

The exemplary bridges 2,4 each have six cells or segments, one for each polarity of each of the phase currents 8A,8B,8C, although the invention is applicable to a wide range of segment counts. For example, segment AP1 refers to the positive polarity of phase A in the first bridge 2, while segment AN1 refers to the negative polarity of phase A in that first bridge 2. The remaining segments of the first and second bridges 2,4 are noted in a similar manner by reference characters BP1,BN1,CP1,CN1 and AP2,AN2,BP2, BN2,CP2,CN2.

Each bridge segment includes its own element, such as the exemplary SCR 12, that has a firing input 14. When a suitable control signal is provided to one of the inputs 14, the corresponding SCR fires to, thereby, control current conduction (e.g., by starting or initiating current conduction) within the corresponding segment. Typically, the individual segments of each of the bridges 2,4 are fired every 60° of the AC cycle in the order: APn,CNn,BPn,ANn,CPn,BNn (where, for convenience of reference, APn, for example, refers to either AP1 or AP2). One of the SCRs 12 does not stop conducting until it is reversed biased. All of the positive rectifier output currents are summed together and the negative rectifier output currents are similarly summed and conveyed by corresponding positive and negative conductors 16,18 to a load (not shown).

An exemplary microprocessor-based control and monitoring circuit 20 has six control outputs 22, which are interconnected with the six firing inputs 14 of the SCRs 12, for outputting control signals to the segments AP1,BP1,CP1, AN1,BN1,CN1 to control current conduction within those segments, and various monitoring inputs 24,26. The six control outputs 22 include six digital logic control signals each of which controls current conduction within a corresponding one of the segments. The circuit 20 employs a firing code that has six bits. Each of the six bits is set when a corresponding segment is to fire (e.g., bit 0 for APn, bit 1 for BPn, bit 2 for CPn, bit 3 for ANn, bit 4 for BNn, and bit 5 for CNn). Each time a firing occurs, two cells are fired. Also, a cell is usually fired a second time in order that the second firing occurs in the next subsequent firing (e.g., by first firing APn and CNn with the firing code=$100001_2$, followed by firing CNn and BPn with the firing code=$100010_2$).

Monitors 28A,28B,28C provide conduction monitor signals to the inputs 26 for the three AC phases A,B,C. The monitors 28A,28B,28C monitor the respective phases A,B,C to provide corresponding conduction signals. The control and monitoring circuits 20 also input current signals from the shunts 30,32 and use that information to control the output of the respective bridges 2,4 through DC contact actuators (not shown).

Figure 2:
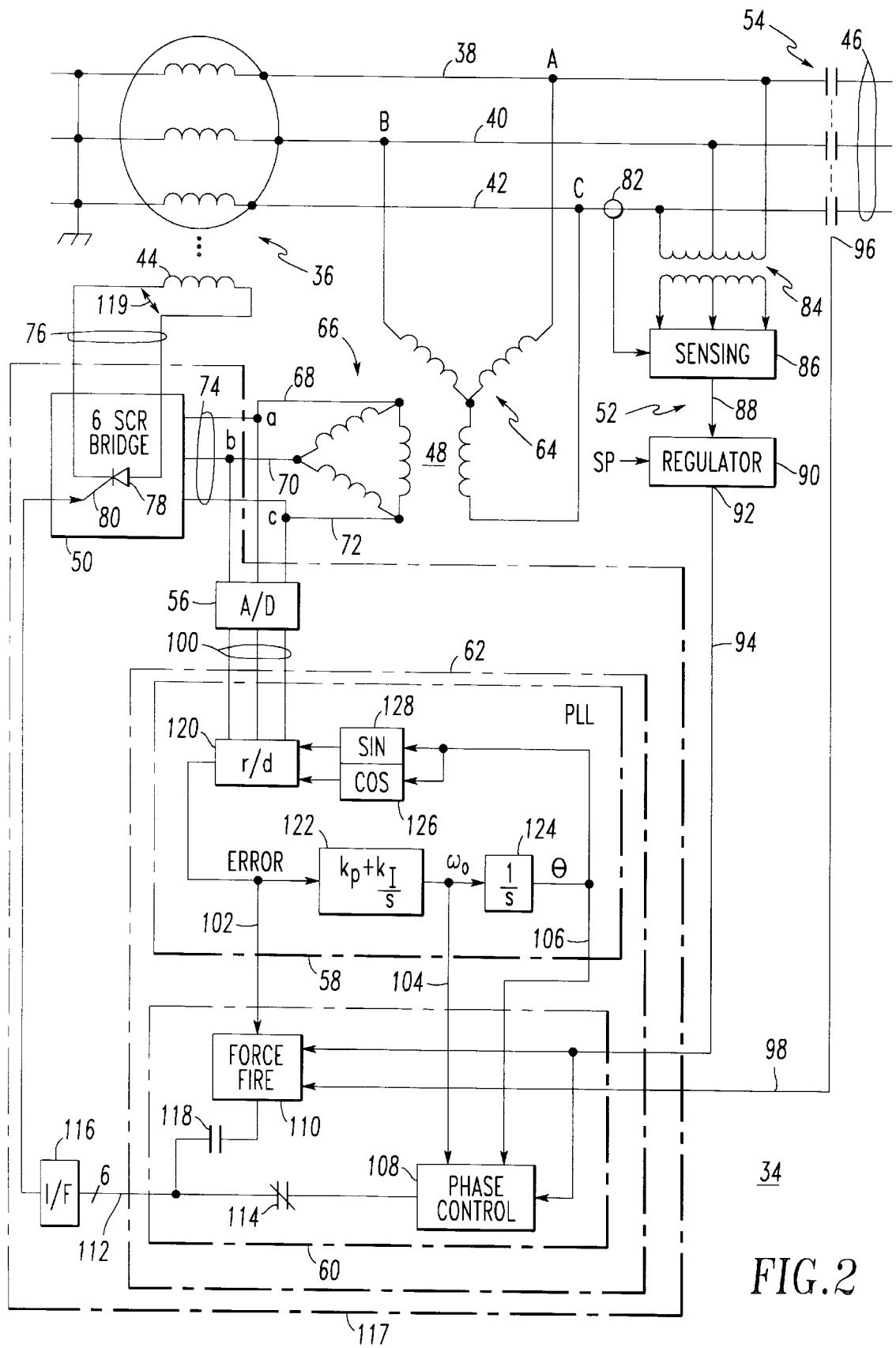
FIG. 2 is a block diagram of an SCR bridge, in accordance with the invention, for use in a generator excitation control system.

Referring to FIG. 2, an excitation control system 34 for generator 36 is illustrated. The generator 36 includes an output having three AC phases 38,40,42 (A,B,C) and a generator field input 44 having an excitation voltage. The three phases 38,40,42 output by the generator 36 provide power to a power circuit 46.

The exemplary excitation control system 34 includes a transformer 48, a controlled rectifier bridge 50, a regulator circuit 52, a generator circuit breaker 54, analog-to-digital (A/D) converters 56, a phase lock loop (PLL) 58, a firing control circuit 60, and a suitable processor, such as microprocessor ($\mu$P) 62. The exemplary transformer 48 is a three-phase PPT including three primary windings 64 in a WYE-configuration and three corresponding secondary windings 66 in a delta-configuration, although other transformer configurations may be employed. The primary windings 64 are interconnected with the AC phases 38,40,42, while the corresponding secondary windings 66 have three AC phases 68,70,72 (a,b,c), respectively, each of which has a positive polarity and a negative polarity and a common frequency (e.g., 50 Hz, 60 Hz, 420 Hz). The PLL 58 typically receives its input 100 from the secondary or bridge side of the PPT 48. The PPT 48 is normally connected to the terminals of the generator 36 and, thus, this exemplary system is commonly referred to as a "terminal fed excitation system."

In a like manner as the bridges 2,4 of FIG. 1, the exemplary six-SCR controlled rectifier bridge 50 includes an input 74 interconnected with the AC phases 68,70,72 of the secondary windings 66 of the transformer 48, an output 76 interconnected with the field input 44 of the generator 36 in order to provide the excitation voltage thereto, and a segment for each of the positive and negative polarities of the AC phases 68,70,72. In turn, each of the segments has an element, such as SCR 78, responsive to a firing control signal 80 in order to control current conduction within the segment between the input 74 and the output 76 of the controlled rectifier bridge 50.

The regulator circuit 52 functions to regulate the output of the generator 36 in terms of phase current and three-phase voltage of the AC phases 38,40,42. The regulator circuit 52 includes a current transformer (CT) 82 and a three-phase potential transformer (PT) 84 which provide corresponding current and voltage signals from the power circuit 46 to a sensing sub-system 86. In turn, the output 88 of the sub-system 86 is input by the regulator sub-system 90 along with one or more setpoints SP. The sub-system 90 employs a suitable control algorithm in order to provide, at output 92, a regulator output signal 94 which, under appropriate conditions, requests a maximum value of the excitation voltage for the generator 36 at the generator field input 44.

For example, the regulator output signal 94 is typically employed to maintain the three-phase voltages to the power circuit 46 (as measured by PT 84) and to increase or decrease the excitation voltage to the generator 36 with respective higher or lower levels of current (as measured by CT 82). In order to accomplish that change, the firing angle employed by the bridge 50 is retarded (reduced) or advanced (increased) to increase or decrease, respectively, the excitation voltage. Thus, if the three-phase voltage of the power circuit 46 goes down, then the regulator output signal 94 goes up, thereby reducing the firing angle and providing more field current to the generator 36.

As is well-known, the generator circuit breaker 54 is employed to connect and disconnect the output of the generator 36 to the power circuit 46. The circuit breaker 54 includes an output 96 having a signal 98 (i.e., "52G BREAKER," which is not to be confused with the regulator circuit 52) which indicates that the circuit breaker separable contacts are closed and the generator 36 is connected to the power circuit 46. Preferably, as is also well-known, the breaker 54 includes one or more auxiliary contacts (not shown) which provide the signal 98.

Preferably, the exemplary μP 62 is employed to provide the functions of the PLL 58 and the firing control circuit 60, although one or both of the PLL 58 and circuit 60 may be provided by equivalent analog or hybrid circuits (not shown). The PLL 58 receives from the A/D converter 56 three digital AC signals 100 which represent the voltage of the three AC phases 68,70,72. In turn, the PLL 58 outputs an error signal 102, a frequency signal 104 and a phase reference signal 106 to the firing control circuit 60.

Figure 5A:
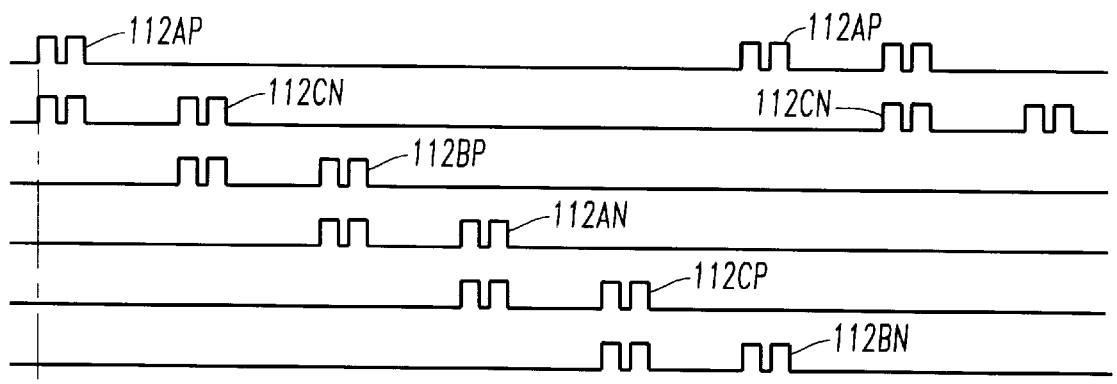
FIGS. 5A and 5B are plots of conventional firing pulses and synchronized force firing pulses, respectively.

The firing control circuit 60 includes a phase control circuit 108 and a "force fire" circuit 110. Under normal operation, the output of the phase control circuit 108 is employed to provide six firing signals 112 through normally closed software contact 114 and interface (I/F) 116 to the controlled rectifier bridge 50. The phase control circuit 108 employs the signals 94,104,106 and provides the firing signals 112 as shown in FIG. 5A. Typically, the individual segments of the bridge 50 are fired every 60° of the AC cycle in the order: APn,CNn,BPn,ANn,CPn,BNn as provided by signals 112AP,112CN,112BP,112AN,112CP,112BN of FIG. 5A, which preferably include a plurality of firing pulses (e.g., two or more, such as a count of 8 pulses, although for convenience of illustration only two pulses are shown). The phase control circuit 108 employs the regulator output signal 94, the frequency signal 104, and the phase reference signal 106 in order to predict the time to fire the six SCRs 78 of the bridge 50 and, thus, control current conduction within the segments. The controlled rectifier bridge 50, A/D 56, μP 62 and I/F 116 form a controlled rectifier bridge system 117.

The "force fire" circuit 110 is employed to repetitively and simultaneously output the control signals 112 to each of the segments in response to the combination of three conditions: (1) the error signal 102 exceeds a predetermined value; (2) the output 94 of the regulator circuit 52 has the signal which requests the maximum value of the excitation voltage for the generator 36; and (3) the output 96 of the generator circuit breaker 54 has the signal 98 which indicates that the generator 36 is connected to the power circuit 46. Under those conditions, the "force fire" circuit 110 outputs the control signals 112, in the manner shown in FIG. 5B, through normally open software contact 118 (which is closed, with normally closed software contact 114 being opened), in order that the controlled rectifier bridge 50 emulates a diode bridge.

By firing the SCRs of the SCR bridge 50 of FIG. 2 in a manner that causes the bridge to emulate a diode bridge, the excitation voltage to the generator 36 is maintained whenever faults or other disturbances in the power circuit 46 affect the input voltage (as input by PPT 48) to the excitation control system 34. This action, depending upon the severity of the fault, may eliminate needless trips.

If the error signal 102 employed by the PLL 58 is relatively large (which indicates that the AC phases 38,40,42 are unbalanced, relatively small in magnitude, and/or are not symmetrical three-phase voltages in accordance with a normal generator output), the generator 36 is on-line, and the output of the voltage regulator 52 is full on (i.e., the generator 36 requires more excitation and maximum excitation is requested), then the SCR bridge 50 is made to act like a diode bridge. This is accomplished by employing a "force firing" function through the circuit 110 which sends synchronized firing pulses (shown in FIG. 5B) to all SCRs in all the SCR bridges, such as 50, at a relatively high rate. The result of force firing is that any voltage at the input 74 to the SCR bridge 50 is rectified and, in turn, the rectified voltage 119 at the output 76 is applied to the generator's excitation field.

The error signal 102 of the PLL 58 is employed since it is an immediate indication of a significant disturbance. The "52G BREAKER" signal 98 is employed since firing control intervention is utilized when the generator 36 is on-line. Otherwise, if the generator is off-line, then no such intervention is required or desired.

The PLL 58 receives the signals 100 from the PPT A/D 56, locks to those signals, and generates the error signal 102, for example, by performing a suitable rotating to direct (r/d) axis transformation function 120. The error signal 102 indicates an abnormal condition of the AC voltages of the AC phases 68,70,72. A proportional plus integral function block 122 employs the error signal 102 and provides the frequency signal 104, $\omega_0$, which follows the frequency of the three sensed phase voltages 100. In turn, a modulo $2\pi$ integration function block 124 outputs the phase reference signal 106, $\Theta$, from the frequency signal 104. In turn, a cosine (COS) function block 126 and a sine (SIN) function block 128 provide suitable feedback to the r/d transformation function 120.

The error signal 102 is, thus, employed to create the phase reference signal 106, $\Theta$, for the phase control circuit 108. With disturbances in the input voltage to the PLL 58, the error signal 102 changes. In turn, this causes the phase reference signal 106 to change. Since the phase control circuit 108 employs the phase reference 106 to determine exactly when to fire each SCR in the SCR bridge 50, a noisy phase reference 106 or error signal 102 causes the output voltage of the SCR bridge 50 to be somewhat unstable. For example, as a result of phase unbalance, some SCRs may be fired too early and, thus, not turned on at all.

It will be appreciated that the PLL 58 or other equivalent circuits may be employed to detect a startup condition, a phase unbalance condition and/or a fault condition of the AC phases 68,70,72. It will further be appreciated that the generator 36 and the excitation control system 34 may alternatively employ a suitable generator starting circuit and algorithm (not shown) for controlling initial start-up of the generator 36 (e.g., when there is no voltage being output by the generator to the three phases 38,40,42).

Figure 3:
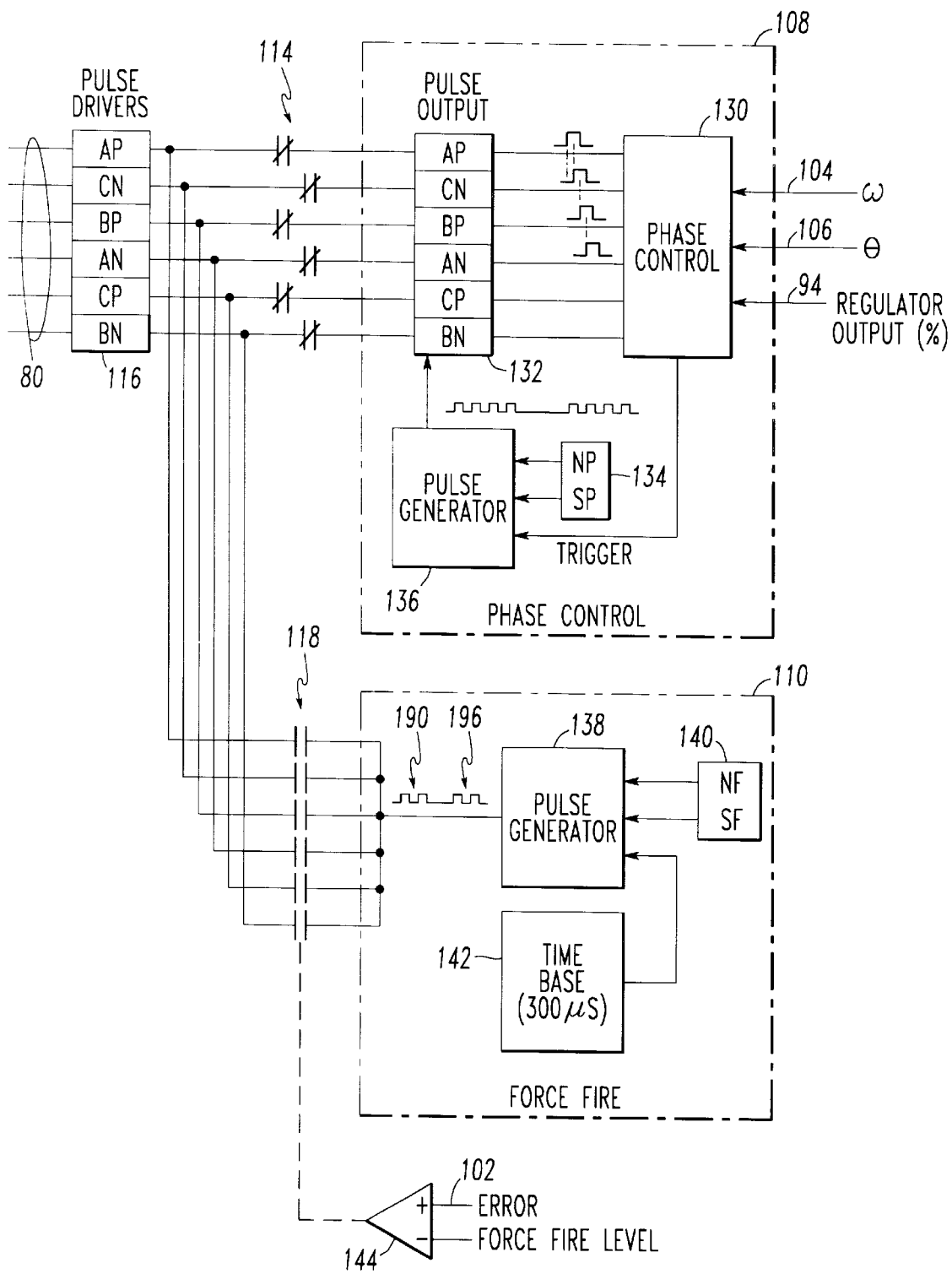
FIG. 3 is a block diagram of the phase control and force fire functions of FIG. 2.

Referring to FIG. 3, the phase control circuit 108 and "force fire" circuit 110 are illustrated. As discussed above in connection with FIG. 2, the phase control circuit 108 outputs some of the control signals 80 to some of the segments in order to control current conduction within the segments. On the other hand, the "force fire" circuit 110 repetitively and simultaneously outputs all of the control signals 80 to the segments in response to abnormal AC phase conditions in order that the SCR bridge 50 emulates a diode bridge.

As shown in FIG. 3, the phase control circuit 108 includes a conventional phase control block 130, six pulse outputs 132, a storage register 134 for storing the count of pulses (NP) and pulse width (SP) for pulse output in the phase control mode, and a pulse generator 136. The phase control block 130 and the pulse outputs 132 cooperate to output pairs of the control signals 80 to a corresponding pair of the segments, with each of the control signals 80 of the pair having a count of pulses and a pulse width which are defined by the storage register 134 and pulse generator 136. As shown in FIG. 5A, the phase control block 130 and pulse outputs 132 output pairs of the control signals 80 to pairs of the segments about six times per AC cycle, with the phase control block 130 employing the frequency signal 104, the phase reference signal 106, and the regulator output signal 94.

Figure 5B:
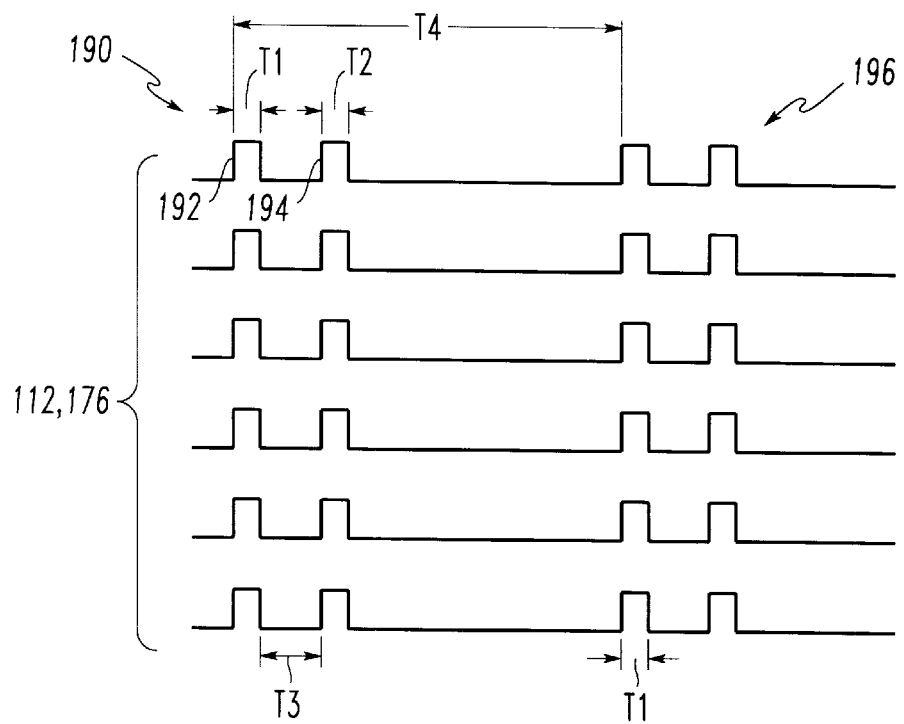

The "force fire" circuit 110 includes a pulse generator 138, a storage register 140 for storing the count of pulses (NF) and pulse width (SF) for pulse output in the "force fire" mode, and a suitable time base 142. The pulse generator 138 and storage register 140 cooperate to output all six of the exemplary control signals 80 as one or more pulses (as shown in FIG. 5B) having a pulse width which is less than the pulse width of the phase control circuit 108. A suitable time base 142 of about 300 to about 400 $\mu$s triggers the pulse generator 138 to repetitively output all of the six exemplary firing pulses at a predetermined period. In this embodiment, the six firing pulses are synchronized and, thus, are sent to each of the segments at the same time.

Selection of the "force fire" circuit 110 is preferably made by comparator block 144 which compares the error signal 102 with a suitable "force fire" level, which is preferably predetermined by employing empirical techniques. When the error signal 102 exceeds the "force fire" level, the normally open software contact 118 is closed and the normally closed contact 114 is opened. Alternatively, other equivalent circuits may determine a startup condition, a phase unbalance condition and/or other fault conditions of the AC phases 68,70,72 of FIG. 2.

Figure 4:
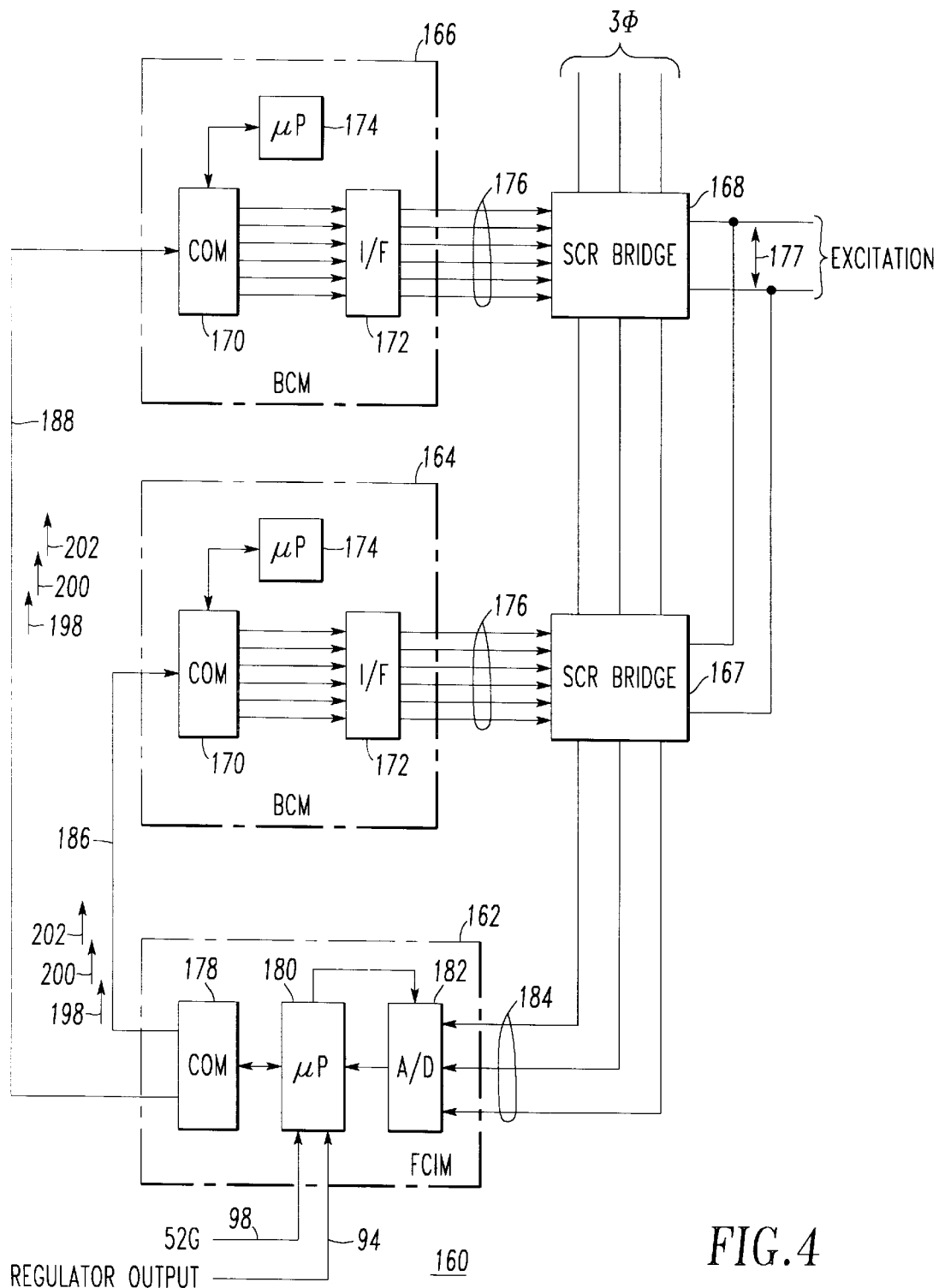
FIG. 4 is a block diagram of a firing control interface module (FCIM) and two bridge control modules (BCMs)

FIG. 4 is a block diagram of a control system 160 including a firing control interface module (FCIM) 162 and two bridge control modules (BCMs) 164,166 for respective SCR bridges 167,168. Each of the BCMs 164,166 includes a suitable communications interface (COM) 170, an interface (I/F) 172 to the corresponding bridge 167,168, and a suitable microprocessor ($\mu$P) 174. The COM 170 and $\mu$P 174 cooperate to send six exemplary firing pulses 176 to all of the segments in the corresponding bridge 167,168. Similar to the bridges 2,4 and 50 of respective FIGS. 1 and 2, the SCR bridges 167,168 output a rectified voltage 177.

The SCR bridge 167, for example, has its own BCM 164 which communicates with the FCIM 162. The FCIM 162 monitors the input voltage to the bridges 167,168 and also communicates with the other BCM 166. Although two exemplary bridges 167,168 are shown, one, three, or more parallel bridges may employed. It will be appreciated that the FCIM 162 controls and communicates with additional bridges in a similar manner.

The FCIM 162 includes a suitable communications interface (COM) 178, a suitable microprocessor ($\mu$P) 180, and an A/D converter 182 which samples the voltages of the three phases 184 through a suitable interface (not shown). The COM 178 of the FCIM 162 communicates with the COMs 170 of the BCMs 164,166 through suitable communication channels 186,188, respectively. In this manner, the FCIM 162 controls the BCMs 164,166 through the corresponding communication channels. In a preferred mode of operation with the plural bridges 167,168, for the force fire mode of operation, the FCIM 162 sends synchronized control signals to each of the BCMs 164,166. In turn, the BCMs 164,166 repetitively send one or more synchronized firing pulses 176 to all of the SCRs in the corresponding bridges 167,168.

Also referring to FIGS. 5A–5B, the FCIM 162 and the BCMs 164,166 cooperate to change the firing pattern in the respective SCR bridges 167,168. The default pattern (FIG. 5A) is preferably sent to all of the BCMs 164,166 via the communications channels 186,188, respectively. Preferably, a user configuration program is employed to readily change the default pattern at the FCIM 162. Otherwise, a factory set default pattern may be employed. Then, when a change to the force fire mode is desired, the FCIM 162 instructs the BCMs 164,166 to employ a default firing pattern for force fire (FIG. 5B). The firing pattern allows configuration for various gate requirements of different sized SCRs (e.g., thyristors). When a sufficiently large error is detected (e.g., as measured at the input 100 to the PLL 58), force fire is invoked and the default pattern is changed for that mode. When force fire is no longer invoked, operation returns to the default firing pattern.

FIG. 5B shows the synchronized force firing pulses 190 which are applied to the six firing signals 112,176. In the exemplary embodiment, the synchronized firing pulses 190 include at least one firing pulse (two exemplary pulses 192,194 are shown in FIG. 5B) for each of the SCRs, with the pulses being repeated at 196. As a further example, in messages sent by the FCIM 162 to each of the BCMs 164,166, the count of pulses and the duration of these pulses are defined by four bits (NS) of those messages which consist of: (1) N, a two-bit number defining one of four possible pulse counts; and (2) S, a two-bit number defining one of four possible pulse sizes (duration).

In this example, there are four possible two-bit numbers and pulse counts: N=$00_2$ provides 1 pulse, N=$01_2$ provides 4 pulses, N=$10_2$ provides 8 pulses, and N=$11_2$ provides 16 pulses. There are also four possible time duration sizes: S=$00_2$ provides 4 $\mu$s duration, S=$01_2$ provides 8 $\mu$s duration, S=$10_2$ provides 12 $\mu$s duration, and S=$11_2$ provides 16 $\mu$s duration. It will be appreciated that the specific example of NS, N and S, the various pulse counts, and the pulse durations are exemplary, and that a wide range of encoding techniques, counts and durations may be employed.

As a further specific example, for NS=$1001_2$=9H=9, a picket pulse burst is provided (N=$10_2$ or 8 pulses, and S=$01_2$ or 8 $\mu$s). In the exemplary embodiment, the duration (T1) of the first force fire pulse 192 is twice the specified duration (T2) of subsequent pulses which are of the specified duration. In this example, the first pulse duration is 16 $\mu$s (2×8 $\mu$s), the interval (T3) separating the pulses 192,194 is 16 $\mu$s (2×8 $\mu$s), and the duration (T2) of the seven additional pulses 194 is 8 $\mu$s each. The total pulse train is 184 $\mu$s, of which there is: 16 μs (T1) for the double-wide first pulse 192, 56 μs ((8−1)×8 μs) single-wide (T2) pulses 194, and 112 μs (7×2×8 μs) double-wide (T3) between pulse times. Typically, the picket pulse burst is repeated about every 300 to about 400 μs (T4), although smaller periods (e.g., 120 μs) and larger repetition periods are possible which provide suitable rectification at the output of the bridges 164,166.

Continuing to refer to FIG. 4, each of the BCMs 164,166 is responsive to a plurality of synchronized control signals 198 for outputting some or all of the firing control signals 176 to some or all of the segments in order to control current conduction within the segments of the corresponding bridges 167,168. One type of control signal 200 is employed for normal mode firing pulses (FIG. 5A). Then, in order to invoke force firing, the FCIM 162 sends another control signal 202 for the "force fire" mode firing pulses (FIG. 5B), which commands the BCMs 164,166 to fire all the SCRs in the respective SCR bridges 167,168.

Upon receipt of the control signal 202, and while force firing is active, the BCMs 164,166 change the firing pulse count and, also, the pulse duration to accommodate the higher energy requirements of this mode. The FCIM 162 sends the control signals 202 at a sufficiently high rate in order that any input voltage to the SCR bridges 167,168 is fully rectified. When force firing is stopped by sending the other control signals 200, the pulse duration is restored to the previous value (FIG. 5A).

During force firing, the energy in the continuous pulse train is controlled in order that it does not exceed the power supply requirements of the firing circuit of I/F 172, or the ratings of any active element (e.g., SCRs, MOSFETs, pulse transformers). The FCIM μP 180 calculates the precise time and pattern of firing and employs a PLL, such as PLL 58 of FIG. 2. The FCIM μP 180 passes this information to the COM 178, which outputs the synchronized control signals 202 to the BCMs 164,166 at the precise time in order to control current conduction within all of the segments of corresponding bridges. Preferably, the COM 178 encodes, serializes and transmits this information to the COMs 170 of the BCMs 164,166. Those BCM COMs 170 receive, decode and implement this information in terms of the physical firing. The BCM COMs 170 also make this information available to the BCM μPs 174.

Under normal firing operation, the FCIM μP 180 calculates the precise time and pattern of firing and employs a PLL, such as PLL 58 of FIG. 2. The FCIM μP 180 passes this information to the COM 178 at the precise time, which outputs the synchronized control signals 200 to the BCMs 164,166 in order to control current conduction within pairs of segments of the corresponding bridges.

For example, at one firing instance, SCRs CPn and ANn (as shown in FIG. 1) of the bridges 167,168 may be fired. Then, about 2.778 ms (at 60 Hz) later, SCRs CPn and BNn would be fired. Next, as a further example, within about the next 2.778 ms, it is determined that force firing is to be invoked, and the FCIM synchronized control signals 202 indicate that each of the SCRs APn,BPn,CPn,ANn,BNn, CNn is to be fired. In response to those signals 202, the BCM μPs 174 instruct the BCM COMs 170 to switch from the standard default value of NS to the value suitable for force firing. Then, about 300 to about 400 μs later (T4), with the next FCIM control signals 202 continuing to indicate that each of the SCRs APn,BPn,CPn,ANn,BNn,CNn is to be fired, the COMs 170 employ the force firing values. In this manner, the count of pulses and/or the duration of pulses employed for force firing may be controlled in order to permit reduced power supply requirements.

Figure 6:
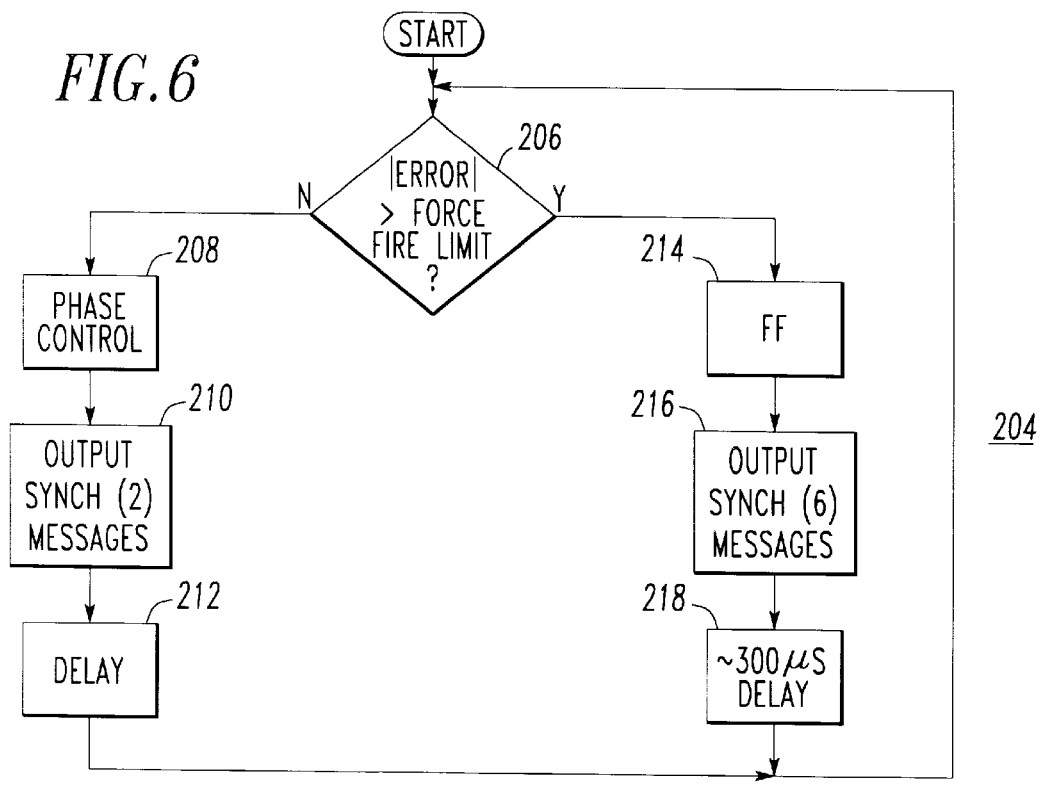
FIG. 6 is a flowchart of software executed by the FCIM processor of FIG. 4.

FIG. 6 is a flowchart of a software routine 204 executed by the FCIM μP 180 of FIG. 4. First, at 206, an abnormal condition of the AC voltages of phases 184 is detected by comparing the absolute value of a PLL error signal, such as signal 102 of FIG. 2, with a suitable predetermined "force fire" level. Alternatively, other equivalent tests may check for a startup condition, a phase unbalance condition and/or other fault conditions of the AC phases. If the "force fire" level is not exceeded, then, at 208, normal phase control is implemented as discussed above in connection with the phase control circuit 108 of FIG. 2. Next, at 210, synchronized control signals 200 are output at the proper time to the BCMs 164,166 in order to fire pairs of the SCRs. Then, after a suitable delay at 212, the sequence is repeated at 206 in order that, normally, the next synchronized control signals 200 and pairs of firing pulses are output about 2.778 ms (i.e., at 60 Hz) later.

On the other hand, if the "force fire" level is exceeded at 206, then, at 214, "force fire" control is implemented as discussed above in connection with the force fire circuit 110 of FIG. 2. Next, at 216, synchronized control signals 202 are output at the proper time to the BCMs 164,166 in order to fire all of the six exemplary SCRs. Then, after a suitable delay at 218, the sequence is repeated at 206 in order that, normally, the next synchronized control signals 202 and set of six exemplary firing pulses are repetitively output every about 300 to about 400 μs. In this manner, in response to abnormal AC phase conditions, the synchronized control signals 202 are sent to the BCMs 164,166 and, in turn, all of the firing pulses 176 are output to the bridges 167,168 to simultaneously fire all of the SCRs in order to emulate diode bridges.

Figure 7:
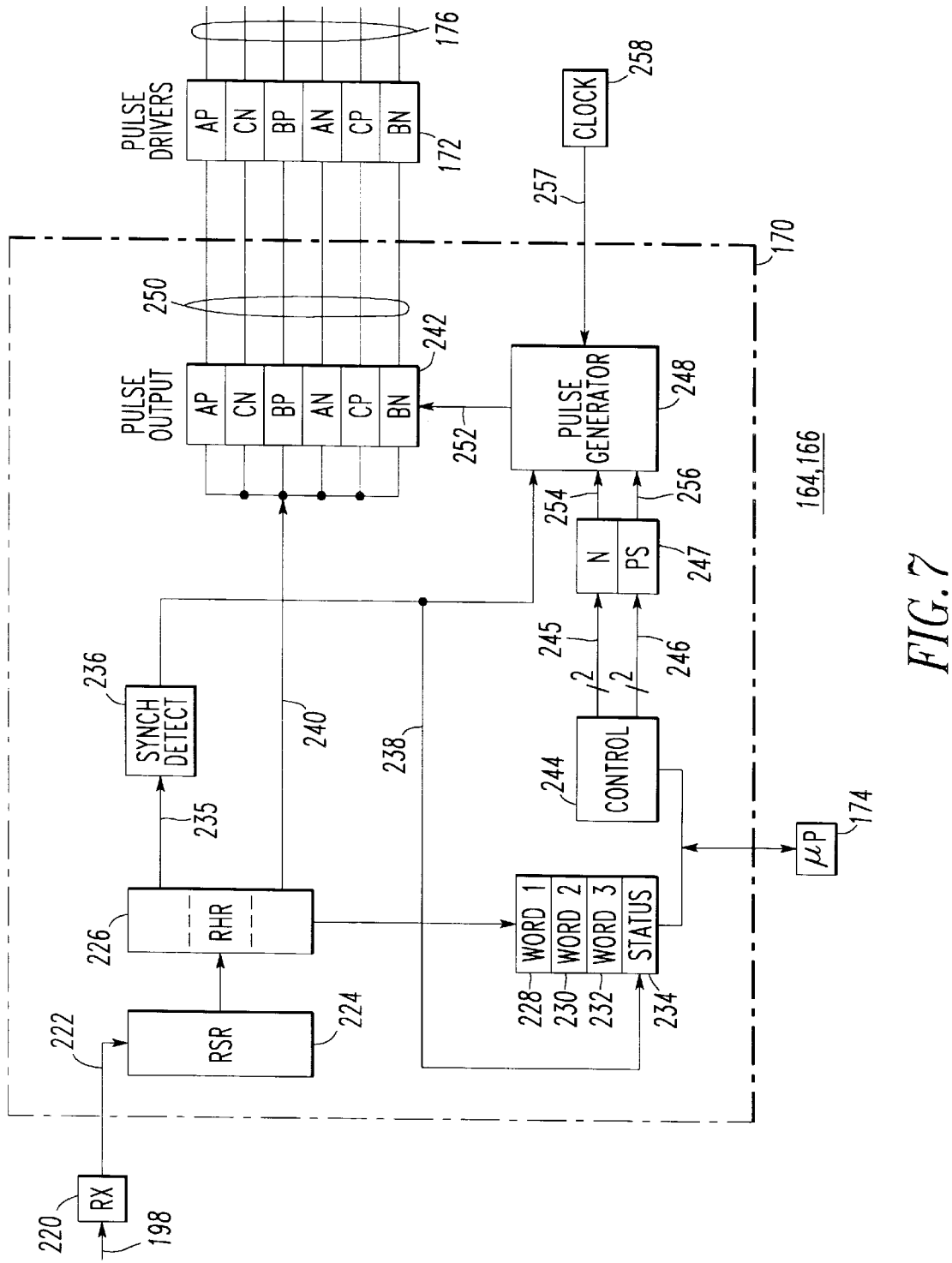
FIG. 7 is block diagram of the BCM communication interface and processor of FIG. 4.

FIG. 7 is block diagram of the COM 170 of the BCMs 164,166 of FIG. 4. The BCM includes a suitable receiver (RX) 220 for receiving the control signals 198 from the FCIM 162. In turn, the RX 220 outputs a serial message 222 to a receive shift register (RSR) 224 of the COM 170. After the serial message 222 is received by the RSR 224, the COM 170 transfers that message to a receive holding register (RHR) 226 for eventual use by the BCM pulse drivers 172 and BCM μP 174. After the message is transferred to the RHR 226, the RSR 224 is ready to receive a subsequent one of the synchronized control signals 198.

In turn, portions of the message in the RHR 226 are made available for access by the μP 174 in read registers 228,230, 232, and other portions of the message or information (e.g., RHR busy, BCH error check OK, error in the message contained in the RHR, a complete message has been received in the RSR, the RSR is occupied with shifting a receive message, SYNCH message) pertaining to that message are made available for access by the μP 174 in status register 234. For example, the status bit RHR busy (RHRB) when set indicates that an unread message is available in the RHR 226, the bit BCH error check (BCH_OK) when set indicates that the message in the RHR 226 has good BCH error check bits (e.g., a good 5-bit BCH cyclic redundancy check (CRC)), and the bit message error indicates that no other message errors were present.

Within the serial message 222 for each of the synchronized control signals 198, a command portion 235, "cmd," includes contiguous bits (e.g., 14 bits) of information in which a "SYNCH" message is defined by "cmd"=0. This condition is recognized by function block 236 which outputs a SYNCH message status 238 to the status register 234. The serial message 222 for each of the synchronized control signals 198 also includes a leg firing portion 240, "leg," which includes contiguous bits (e.g., 6 or 12 bits) of firing information, one for each of the firing control signals 176 and, thus, one for each of the corresponding segments (e.g., 6 or 12 SCRs) of the bridge.

For the normal synchronized control signals 200 for a 6-SCR bridge, a pair of the "leg" bits of message portion 240 are set for a pair of the firing control signals 176. On the other hand, for the force fire synchronized control signals 202 for a 6-SCR bridge, all of the "leg" bits of message portion 240 are set for all of the firing control signals 176. For example, the "leg" bits act as gating for the SCR firing pulse drivers 172. A "leg" bit being set to '1' enables the generated "picket pulses" to be gated to the corresponding pulse driver 172 and then to the corresponding SCR.

When one of the BCMs 164,166 receives the synchronized control signal 198 which outputs a SYNCH message status 238, the "leg" bits 240 are captured in output (OUT) registers 242 to control the firing of the SCRs. That firing is also controlled by the $\mu$P 174 by writing information to a control register 244 of the COM 170. The exemplary control register 244 includes two bits 245 (N0C,N1C) which define a current count (e.g., one or more) of firing pulses 176 to be output to the SCRs, and two bits 246 (PS0C, PS1C) which define a current pulse width of the firing pulses 176. Those bits 245,246 are stored in registers 247 (N,PS) for output to a pulse generator 248. In response to the SYNCH message status 238 and the bits N and PS of the registers 247, the pulse generator 248 and output register 242 cooperate to provide at outputs 250 the "leg" bits 240 as qualified by pulses at output 252, which pulses are defined by the count N 254 and the pulse width PS 256.

For example, based upon an exemplary 16 MHz clock 257 output by clock 258 to the pulse generator 248, an exemplary 4 $\mu$s $\tau$) base time is determined as a foundation time block for the pulse bursts to the SCRs (i.e., the so-called picket fence gating). The pulse width PS 256 is then determined from the values of PS1C and PS0C (e.g., $00_2$=4 $\mu$s, $01_2$=8 $\mu$s, $10_2$=12 $\mu$s, and $11_2$=16 $\mu$s), with the index PS1C and PS1C determining the size of the SCR picket firing pulses. Also, in the exemplary embodiment, the structure of the "picket" pulse train is one pulse of duration 2*$\tau$, followed by pulses (if any) of duration $\tau$, with the separation between pulses being 2*$\tau$. The count of pulses, including the double duration first pulse, is controlled by the count N 254 from the values of N1C and N0C (e.g., $00_2$=1 pulse, $01_2$=4 pulses, $10_2$=8 pulses, and $11_2$=16 pulses), with the index N1C and N2C determining the count of SCR picket pulses generated for each received SYNCH message.

Figure 8:
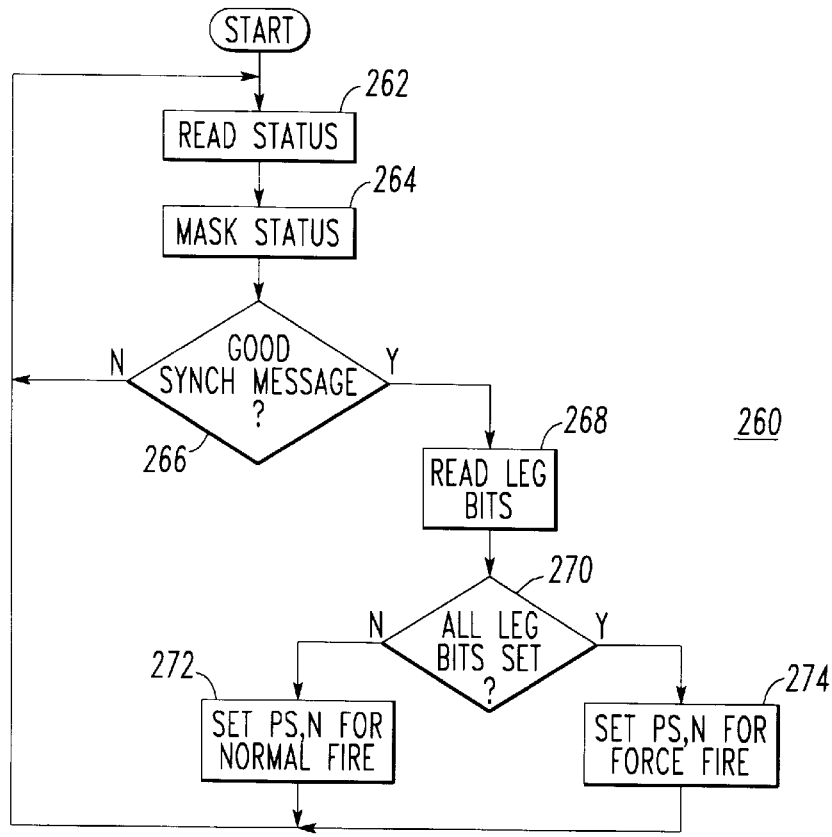
FIG. 8 is a flowchart of software executed by the BCM processor of FIG. 4.

FIG. 8 is a flowchart of a software routine 260 executed by the BCM $\mu$P 174 of FIG. 4. At 262, the status register 234 of FIG. 7 is read and, at 264, that result is ANDed with a suitable mask to determine that the RHR 226 is busy, the BCH error check is OK, no error exists in the message contained in the RHR 226, and the SYNCH message status 238 is set. Next, at 266, if the conditions masked at 264 are set, then a good SYNCH message has been received. If so, then, at 268, the "leg" bits are read from the registers 228,230,232. At 270, it is determined whether all of the "leg" bits are set (e.g., 6 bits for a 6-pulse bridge, 12 bits for a 12-pulse bridge). If not, then, at 272, since a normal synchronized control signal 200 was received, suitable bits (N0C,N1C,PS0C,PS1C) for defining normal firing pulses are output to the control register 244. On the other hand, if all the "leg" bits are set, then, at 274, since a force fire synchronized control signal 202 was received, suitable bits (N0C,N1C,PS0C,PS1C) for defining force firing pulses are output to the control register 244.

Alternatively, a "force fire" bit in each of the synchronized control signals 198 may be employed to distinguish the normal synchronized control signals 200 from the force fire synchronized control signals 202. In that event, at 268, the "force fire" bit is read from the registers 228,230,232. At 270, it is determined whether the "force fire" bit is set. If not, then, at 272, since a normal synchronized control signal 200 was received, suitable bits for defining normal firing pulses are output to the control register 244. On the other hand, if the "force fire" bit was set, then, at 274, since a force fire synchronized control signal 202 was received, suitable bits for defining force firing pulses are output to the control register 244.

In this manner, the count of pulses and the pulse width are defined by the previous received one of the synchronized control signals 198. Thus, after an initial force fire synchronized control signal 202 is received, the pulse generator 248 and output register 242 respond to the "leg" bits 240 of that initial control signal 202 independent of $\mu$P 174 and software routine 260, and cooperate to output all of the firing control signals at output 250 to the pulse drivers 172. However, the first set of force fire pulses employs the pulse count and pulse width settings for the normal mode firing pulses. Then, within the interval (e.g., about 300 to 400 $\mu$s) before the second force fire synchronized control signal 202 is received, the $\mu$P 174 and software routine 260 adjust the count of pulses and the pulse width for the force fire mode. After that adjustment is made, the second force fire synchronized control signal 202 is received by the RSR 224, the message is transferred to the RHR 226, and the "leg" bits 240 are applied to the output register 242. In turn, the pulse generator 248 employs the adjusted count of pulses and the adjusted pulse width, and, thus, the second set of force fire pulses employs the pulse count and pulse width settings for the force fire mode. In this manner, the pulses, as adjusted, are output at a faster repetition rate, but are decreased to an appropriate count and shrunk to an appropriate size, thereby reducing the energy requirements of the continuous pulse train. For example, the first set of force fire pulses employs the standard default value of PS (e.g., 8 $\mu$s) and N (e.g., 4) values, while subsequent force fire pulses employ the PS (e.g., 4 or 8 $\mu$s) and N (e.g., 1 or 4) values suitable for force firing. Still other force fire embodiments may employ two, three or more pulses and/or other pulse widths.

While specific embodiments of the invention have been described in detail, it will be appreciated by those skilled in the art, that various modifications and alternatives to those details could be developed in light of the overall teachings of the disclosure. Accordingly, the particular arrangements disclosed are meant to be illustrative only, and not limiting as to the scope of invention which is to be given the full breadth of the claims appended and any and all equivalence thereof.

What is claimed is:

1. A controlled rectifier bridge for converting a plurality of alternating current (AC) voltages from a plurality of alternating current phases to a rectified voltage, each of said alternating current phases having a positive polarity and a negative polarity, said controlled rectifier bridge comprising:

an input interconnected with said alternating current phases;

an output having said rectified voltage;

a segment for each of the positive and negative polarities of said alternating current phases, each of said segments having an element responsive to a control signal in order to control current conduction within said segment between the input and the output of said controlled rectifier bridge;

means for outputting some of the control signals to some of said segments in order to control current conduction within said segments;

means for detecting an abnormal condition of the AC voltages of said alternating current phases; and means for repetitively and simultaneously outputting all of the control signals to said segments in response to said abnormal condition in order that said controlled rectifier bridge emulates a diode bridge.

2. The bridge of claim 1 wherein said means for outputting some of the control signals includes means for outputting pairs of said control signals to a corresponding pair of said segments, with each of the control signals of said pair being at least one pulse having a first pulse width; and wherein said means for repetitively and simultaneously outputting all of the control signals includes means for outputting each of said all of the control signals as at least one pulse having a second pulse width which is less than said first pulse width.

3. The bridge of claim 2 wherein said means for outputting each of said all of the control signals includes means for repetitively outputting said at least one pulse having the second pulse width every about 300 to about 400 $\mu$s.

4. The bridge of claim 1 wherein said plurality of alternating current phases is three phases; where said segments include six silicon controlled rectifiers for the positive and negative polarities of said three phases; wherein the AC voltages of said alternating current phases have a frequency which defines a cycle; and wherein said means for outputting some of the control signals to some of said segments includes means for outputting pairs of said control signals to pairs of said segments about six times per cycle.

5. The bridge of claim 4 wherein said means for repetitively and simultaneously outputting all of the control signals includes means for repeating said all of the control signals every about 300 to about 400 $\mu$s.

6. The bridge of claim 1 wherein each of said alternating current phases includes a phase voltage having a frequency; wherein said means for detecting an abnormal condition includes:

means for sensing said phase voltages, and phase lock loop means employing the sensed phase voltages for providing an error signal therefrom, said phase lock loop means including means employing the error signal for providing a frequency which follows the frequency of said sensed phase voltages, and means for providing an angle from said frequency; and wherein said means for outputting some of the control signals includes means employing said frequency and said angle for controlling said segments.

7. The bridge of claim 6 wherein said means for repetitively and simultaneously outputting all of the control signals includes means for repeating said all of the control signals every about 300 to about 400 $\mu$s.

8. The bridge of claim 1 wherein said means for detecting an abnormal condition includes means for detecting a startup condition of said alternating current phases.

9. The bridge of claim 1 wherein said means for detecting an abnormal condition includes means for detecting a phase unbalance condition of said alternating current phases.

10. The bridge of claim 1 wherein said means for detecting an abnormal condition includes means for detecting a fault condition of said alternating current phases.

11. The bridge of claim 1 wherein said elements are semiconductor controlled rectifiers.

12. The bridge of claim 1 wherein said means for repetitively and simultaneously outputting the control signals to each of said segments includes means for sending a firing pulse to each of said segments at the same time.

13. The bridge of claim 1 wherein said means for repetitively and simultaneously outputting the control signals to each of said segments includes means for sending synchronized firing pulses to all of said segments.

14. The bridge of claim 13 wherein said synchronized firing pulses include at least one firing pulse for each of said segments, with said at least one firing pulse being repeated every about 300 to about 400 $\mu$s.

15. A system for converting a plurality of alternating current (AC) voltages of a plurality of alternating current phases to a rectified voltage, each of said alternating current phases having a positive polarity and a negative polarity, said system comprising:

a plurality of controlled rectifier bridges, each of said bridges comprising:

an input interconnected with said alternating current phases, an output having said rectified voltage, and a segment for each of the positive and negative polarities of said alternating current phases, each of said segments having an element responsive to a firing control signal in order to control current conduction within said segment between the input and the output of said controlled rectifier bridge;

a plurality of bridge control means, each of said bridge control means responsive to a plurality of synchronized control signals for outputting some or all of the firing control signals to some or all of said segments in order to control current conduction within said segments of a corresponding one of said bridges; and a central control circuit comprising:

means for outputting a plurality of first synchronized control signals to said bridge control means in order to control current conduction within some of said segments of corresponding ones of said bridges, means for detecting an abnormal condition of the AC voltages of said alternating current phases, and means responsive to said abnormal condition for outputting a plurality of second synchronized control signals to said bridge control means in order to simultaneously output all of the firing control signals to all of said segments.

16. The system of claim 15 wherein each of the firing control signals includes at least one pulse having a pulse width; and wherein each of said synchronized control signals includes a message portion having a bit for each of said firing control signals.

17. The system of claim 16 wherein each of said first synchronized control signals includes the message portion having a pair of said bits set for a pair of said firing control signals; and wherein each of said second synchronized control signals includes the message portion having each of said bits set for each of said firing control signals.

18. The system of claim 17 wherein said bridge control means includes:

means for defining a current count of pulses and a current pulse width from a previously received one of the synchronized control signals;

means for receiving a subsequent one of the synchronized control signals;

means for outputting all of the firing control signals in response to said subsequent one of the synchronized control signals, with the count of pulses and the pulse width being defined by said current count of pulses and said current pulse width; and means for adjusting said current count of pulses and said current pulse width from said subsequent one of the synchronized control signals in order that still subsequent ones of the synchronized control signals employ the adjusted count of pulses and the adjusted pulse width.

19. The system of claim 18 wherein said means responsive to said abnormal condition for outputting a plurality of second synchronized control signals includes means for repetitively outputting said second synchronized control signals every about 300 to about 400 µs.

20. The system of claim 18 wherein said means for outputting all of the firing control signals responds to the message portion of said subsequent one of the synchronized control signals independent of said means for adjusting said current count of pulses and said current pulse width; and wherein said means for adjusting said current count of pulses and said current pulse width from said subsequent one of the synchronized control signals operates before said means for receiving a subsequent one of the synchronized control signals receives said still subsequent ones of the synchronized control signals.

* * * * *